US010824689B2

(12) United States Patent
Lear et al.

(10) Patent No.: US 10,824,689 B2
(45) Date of Patent: Nov. 3, 2020

(54) SHARING POINT OF INTEREST DATA

(71) Applicant: VERIZON PATENT AND LICENSING INC., Basking Ridge, NJ (US)

(72) Inventors: Peter J. Lear, Hamilton (CA); Victor J. Rehorst, Whitby (CA); Weiyu Liang, Richmond Hill (CA)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 153 days.

(21) Appl. No.: 15/870,024

(22) Filed: Jan. 12, 2018

(65) Prior Publication Data

US 2019/0220526 A1   Jul. 18, 2019

(51) Int. Cl.
*G06F 16/00*     (2019.01)
*G06F 16/9537*   (2019.01)
*G01C 21/36*     (2006.01)
*G06F 16/29*     (2019.01)
*G06F 16/22*     (2019.01)

(52) U.S. Cl.
CPC ..... *G06F 16/9537* (2019.01); *G01C 21/3679* (2013.01); *G06F 16/2228* (2019.01); *G06F 16/29* (2019.01)

(58) Field of Classification Search
None
See application file for complete search history.

(56) References Cited

U.S. PATENT DOCUMENTS

| 9,769,610 | B1* | 9/2017 | Gordon | H04W 4/023 |
| 2012/0202525 | A1* | 8/2012 | Pettini | H04W 4/06 |
| | | | | 455/456.3 |
| 2013/0281122 | A1* | 10/2013 | Zelinka | H04W 64/00 |
| | | | | 455/456.3 |
| 2017/0146350 | A1* | 5/2017 | Beaurepaire | G07C 9/38 |
| 2018/0249298 | A1* | 8/2018 | Jain | H04L 67/18 |
| 2018/0352373 | A1* | 12/2018 | Sahadi | G06F 3/04842 |

OTHER PUBLICATIONS

Road Hunter, "Road Hunter Personal Navigation Assistant for Truck Drivers", http://www.roadhunter.us/, Aug. 11, 2016, 10 pages.

* cited by examiner

*Primary Examiner* — Son T Hoang

(57) ABSTRACT

A server device can receive, from a first device related to a first subscriber of a navigation service, data relating to a point of interest (POI), and an indication to share the data. The data can include on-site information associated with the POI. The on-site information can include one or more instructions regarding arrival at or departure from the POI. The device can store the data to permit the data to be accessible to other subscribers of the navigation service. The device can receive a location search request from a second device related to a second subscriber of the navigation service. The second subscriber can be different than the first subscriber. The device can determine that the location search request corresponds to the POI. The device can perform one or more actions to cause the data relating to the POI to be provided to the second device.

20 Claims, 10 Drawing Sheets

SHARING POINT OF INTEREST DATA

BACKGROUND

A navigation system can provide location, direction, and/or navigation information. For example, an automotive navigation system can include a satellite receiver that determines a vehicle's position, and performs routing functions to provide directions to a driver.

A point of interest (POI) is a specific point location, such as a store, an attraction site, a hotel, a fuel station, or the like, that one may find useful or interesting. In a global positioning system (GPS), a POI can be specified by a name or description, an address, latitude and longitude information, or the like.

DETAILED DESCRIPTION OF PREFERRED EMBODIMENTS

Figure 1A:
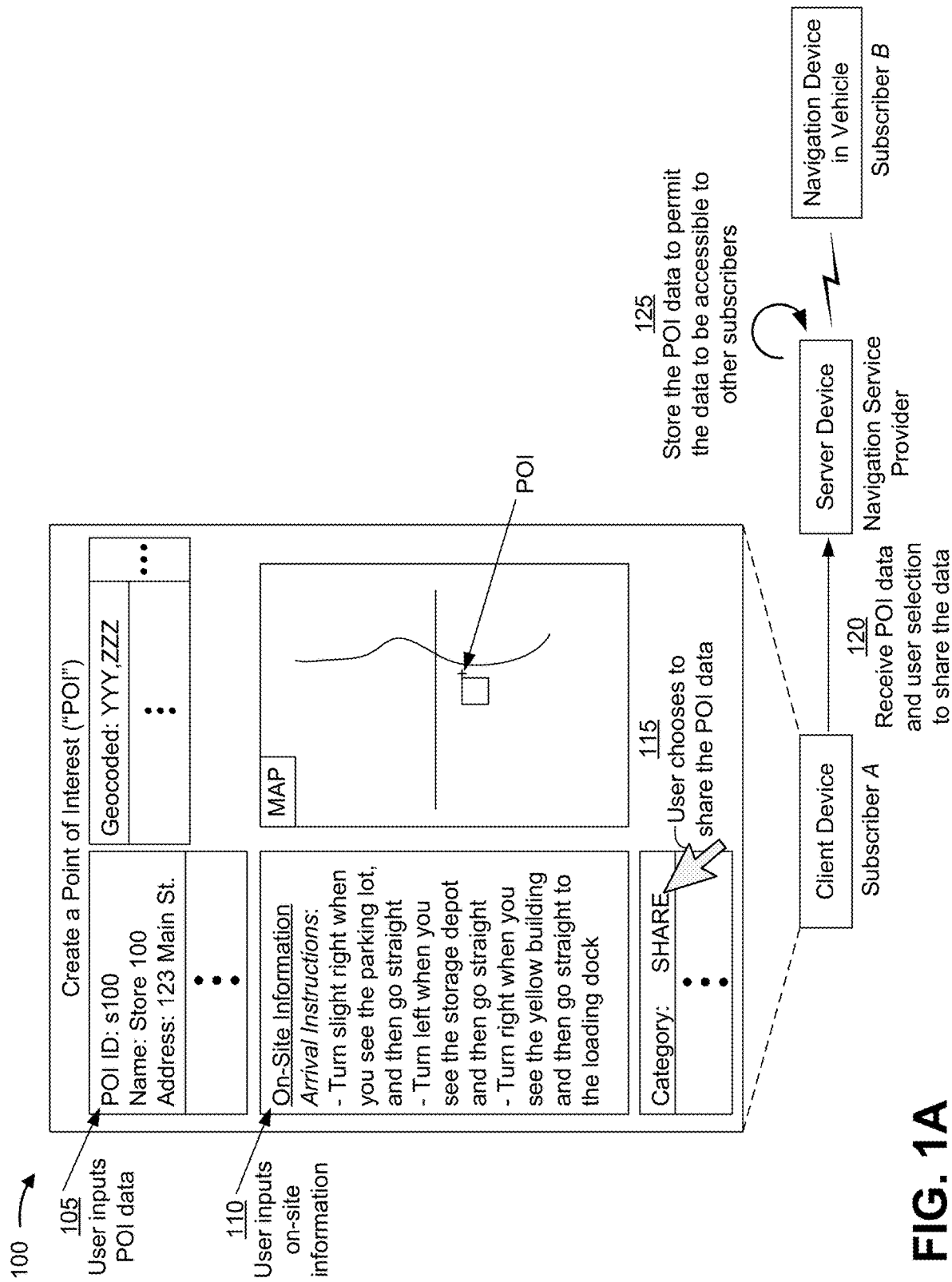
FIGS. 1A-1E are diagrams of an overview of an example implementation described herein.

The following detailed description of example implementations refers to the accompanying drawings. The same reference numbers in different drawings can identify the same or similar elements.

Many brick-and-mortar locations (e.g., stores, distribution locations, or storage locations, such as warehouse locations) have complicated or hazardous on-site route layouts. Some locations may have restricted areas (e.g., customer parking lots, on-site employees-only areas, etc.) that only certain individuals are permitted to enter. Without guidance from the owner (or operator) of such a location (e.g., as to the recommended path to take when arriving at and/or departing from the location, or the areas or obstacles that need to be avoided when on-site), it can be challenging for delivery personnel, such as truck drivers, forklift/crane operators, etc., to navigate through the location when conducting deliveries, pickups, and/or the like. For example, a delivery driver may get lost on-site, resulting in frustration and lost time and productivity, and may even get into an accident.

Some implementations, described herein, provide a device (e.g., a server device) that is capable of permitting a subscriber to create, store, and/or share the subscriber's POI data, including on-site information regarding arrival at the POI and/or departure from the POI, with other subscribers. In some implementations, described herein, the device is capable of receiving requests from other subscribers for data relating to a POI that has been shared, and providing the shared POI data to the other subscribers. In this way, other subscribers can, when visiting the POI, utilize shared POI data, such as on-site arrival and/or departure information, to avoid any restricted areas that may be on-site, avoid any hazards that may be on-site, and/or the like. In addition, this reduces or eliminates a need for a dispatcher to guide a driver through a site, permits delivery personnel to utilize a best route when arriving at and/or departing from a POI (thereby reducing the risk of on-site accidents), conserves energy (e.g., fuel) that would otherwise be wasted from drivers driving around and searching for the best route at a POI, and/or conserves memory resources of a device associated with a driver (e.g., a navigation device in the vehicle) by reducing or eliminating a need for the device to pre-store POI data.

FIGS. 1A-1E are diagrams of an overview of an example implementation 100 described herein. As shown in FIGS. 1A-1E, example implementation 100 can include a client device associated with a subscriber A, a server device associated with a navigation service provider, and a navigation device associated with a subscriber B, which can be different than subscriber A. The navigation device can be located in a vehicle and can include, for example, a GPS receiver and/or the like. The server device can receive data from the client device, the navigation device, and/or the vehicle, and/or send data to the client device, the navigation device, and/or the vehicle. Although FIGS. 1A-1E show a single client device, a single server device, a single navigation device, and a single vehicle, in practice, there can be hundreds, thousands, millions, etc. of client devices, server devices, navigation devices, and/or vehicles. In this way, example implementation 100 can coordinate with a set of devices and/or operate on a data set that cannot be managed manually or objectively by a human actor.

As shown in FIG. 1A, the client device can provide a user interface that displays an interactive geographical map, and that provides one or more fields for inputting POI-related data. For example, the user interface can be provided by the server device to the client device to permit a user of the client device to create and/or edit POI data.

As shown by reference number 105, a user of the client device can input, to the user interface, data relating to a POI. For example, as shown, the user can input a POI ID ("s100"), a name for the POI ("Store 100"), and an address of the POI ("123 Main St.") to the user interface. As shown in FIG. 1A, the user interface can display a geocode of the POI, and can display the POI on the map.

As further shown in FIG. 1A, and as shown by reference number 110, the user can input on-site information, such as on-site arrival instructions, relating to the POI. As shown, the on-site arrival instructions can include instructions on how a driver is to navigate through the POI upon arrival (e.g., "Turn slight right when you see the parking lot, and then go straight," "Turn left when you see the storage depot and then go straight," and "Turn right when you see the yellow building and then go straight to the loading dock"). Such on-site information can be particularly beneficial when the area at the POI is complicated, not well marked, not well lit, not well laid out, not covered by navigation systems, and/or the like.

Although not shown, the user can additionally, or alternatively, input other on-site information relating to the POI, such as on-site departure instructions (e.g., instructions on how a driver is to navigate through the POI when departing the POI), on-site radio communication channel information, on-site access code information (e.g., for buildings, storage areas, and/or the like), on-site parking information, notes regarding the POI, advisories regarding the POI, geofence information (e.g., information regarding a virtual perimeter defining a boundary of an area at the POI, such as a commercial yard), one or more road modifiers (e.g., preferred routes to the POI, restrictions on the roads that can be taken, restrictions on the types of turns that can be made, such as no left turns, and/or the like), and/or the like. Such other on-site information can be particularly beneficial when the area at the POI is complicated, not well marked, not well lit, not well laid out, not covered by navigation systems, and/or the like.

As shown in FIG. 1A, the user interface of the client device can provide an option for a user to share the POI data. As shown by reference number 115, the user can select the option to share the POI data. As further shown in FIG. 1A, and as shown by reference number 120, the server device can receive, from the client device, the POI data and the user selection to share the POI data. As shown by reference number 125, the server device can store the POI data to permit the POI data to be accessible to other subscribers (e.g., subscriber B). For example, the server device can store the POI data in a data structure (e.g., a database) and cause the stored data to be accessible to searching by other subscribers, such as subscriber B.

Figure 1B:
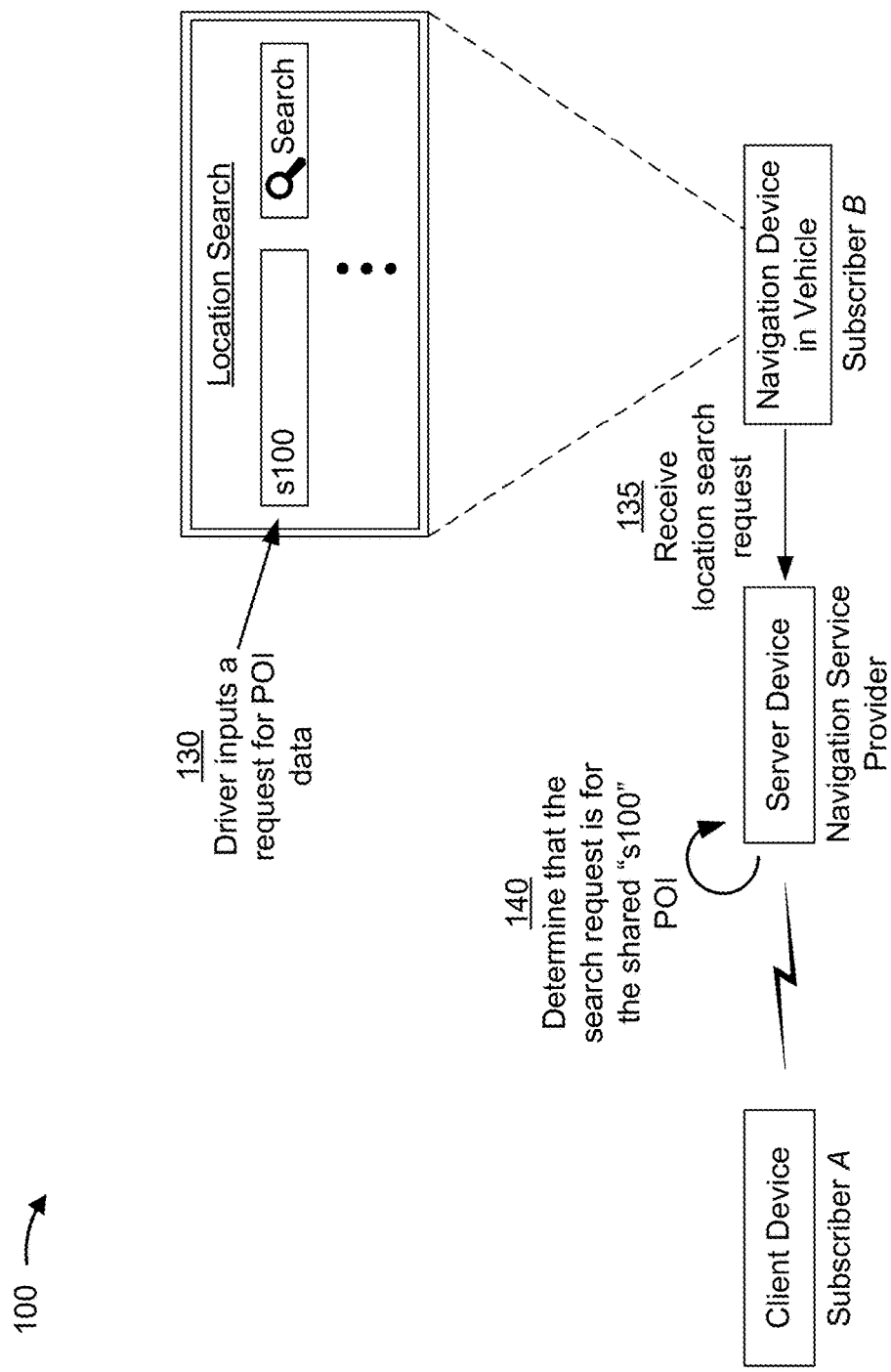

As shown in FIG. 1B, the navigation device can provide a user interface that permits the driver of the vehicle to input a request for POI data. As shown by reference number 130, the driver can input "s100" into an input field, provided on the user interface, for submission to the server device. As shown by reference number 135, the server device can receive the location search request from the navigation device. As shown by reference number 140, the server device can determine that the search request corresponds to a POI for which POI data has been shared. For example, the server device can search the data structure for POI data associated with the search term "s100," and can identify the shared POI data as a match.

Figure 1C:
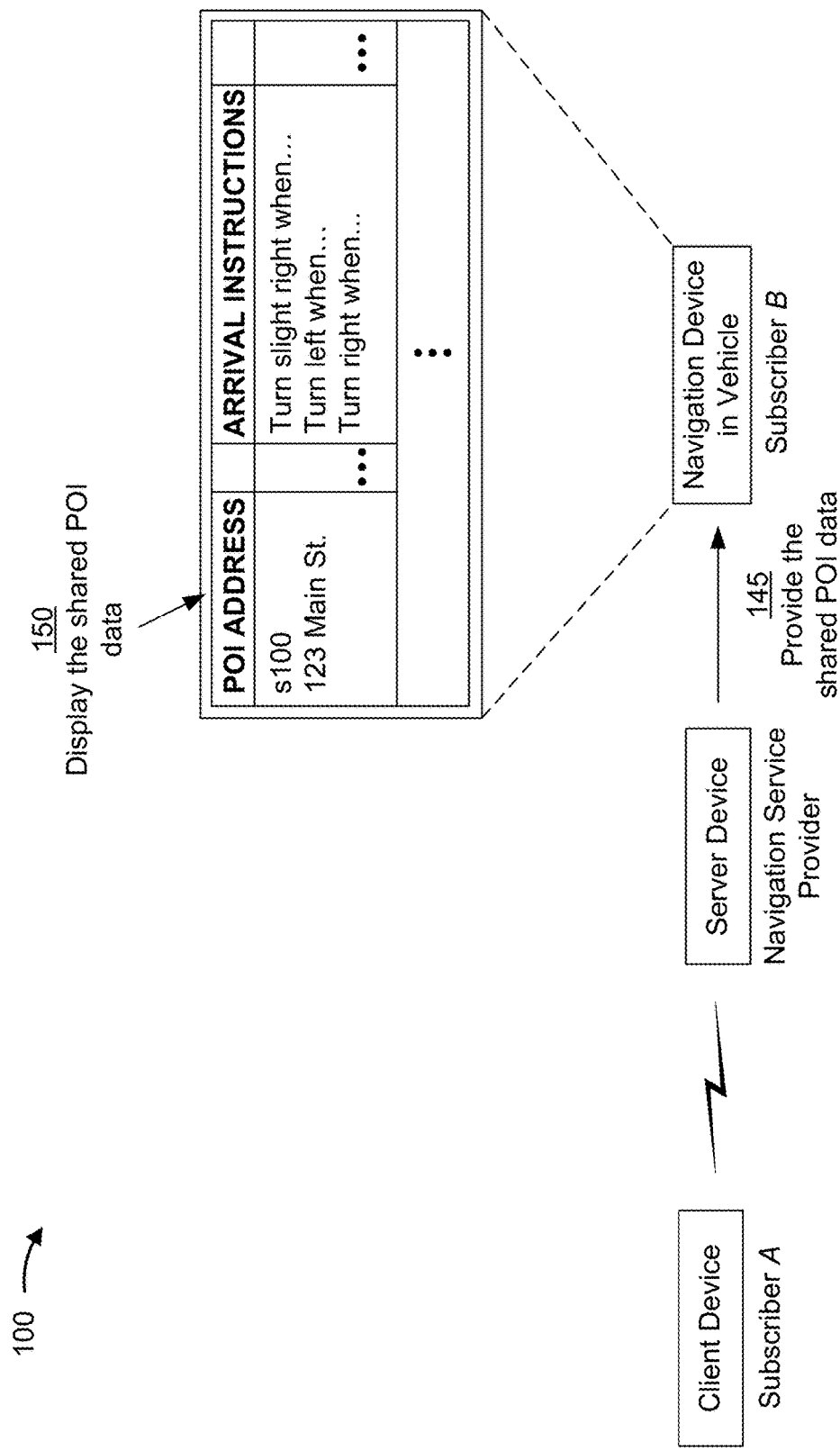

As shown in FIG. 1C, and as shown by reference number 145, the server device can provide the shared POI data to the navigation device. For example, the server device can provide the physical address of the POI, on-site information regarding the POI, such as on-site arrival instructions, on-site departure instructions, and/or other on-site information, and/or the like. As shown by reference number 150, the navigation device can display, on the user interface, the shared POI data, including address information and arrival instructions.

Figure 1D:
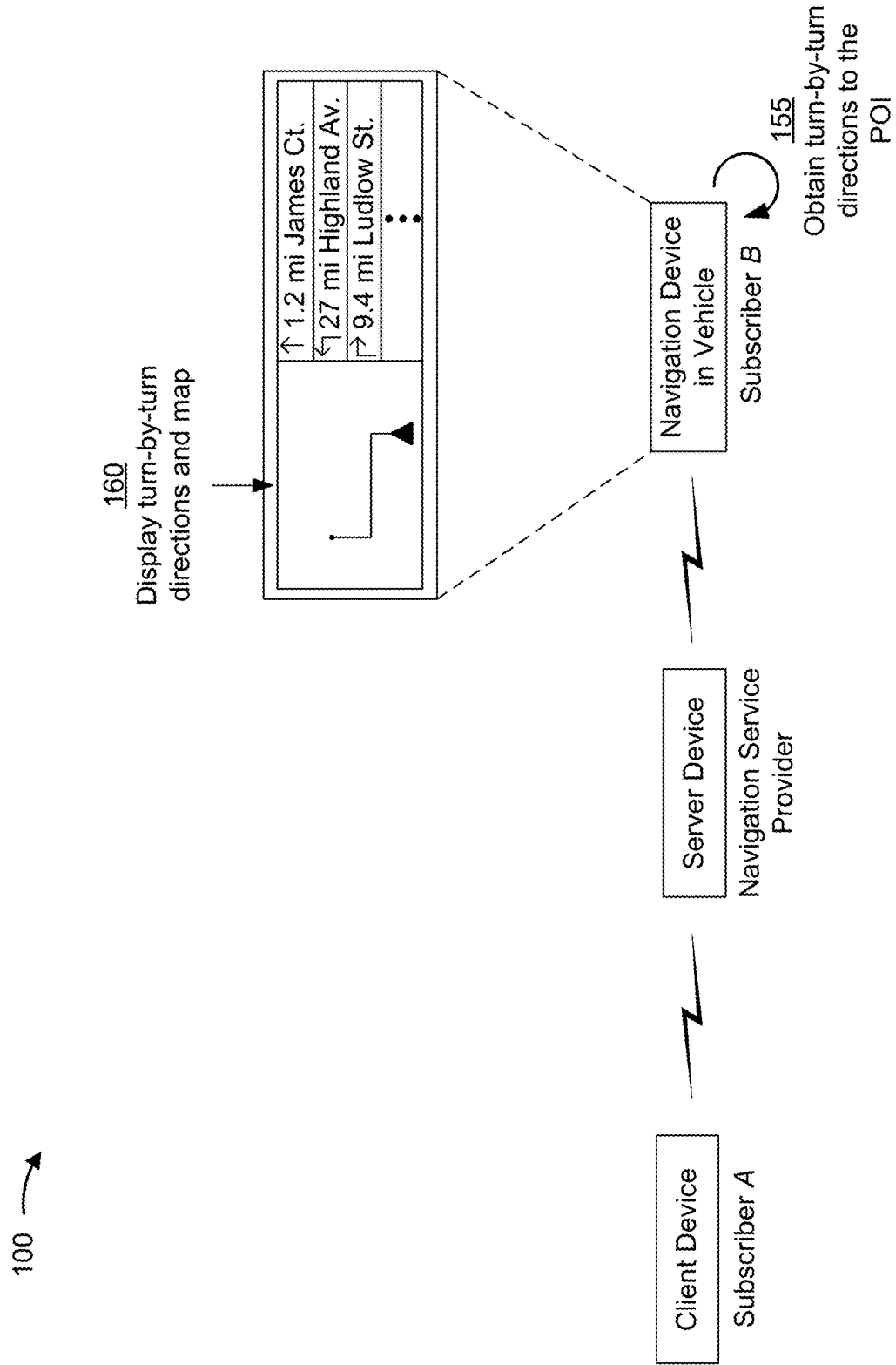

As shown in FIG. 1D, and as shown by reference number 155, the navigation device can obtain turn-by-turn directions to the POI (e.g., based on the current location of the vehicle as determined using a GPS receiver). As shown by reference number 160, the navigation device can display, on the user interface, the turn-by-turn directions and a geographical map showing the current location of the vehicle, which can provide route guidance to the driver during the journey to the POI.

Figure 1E:
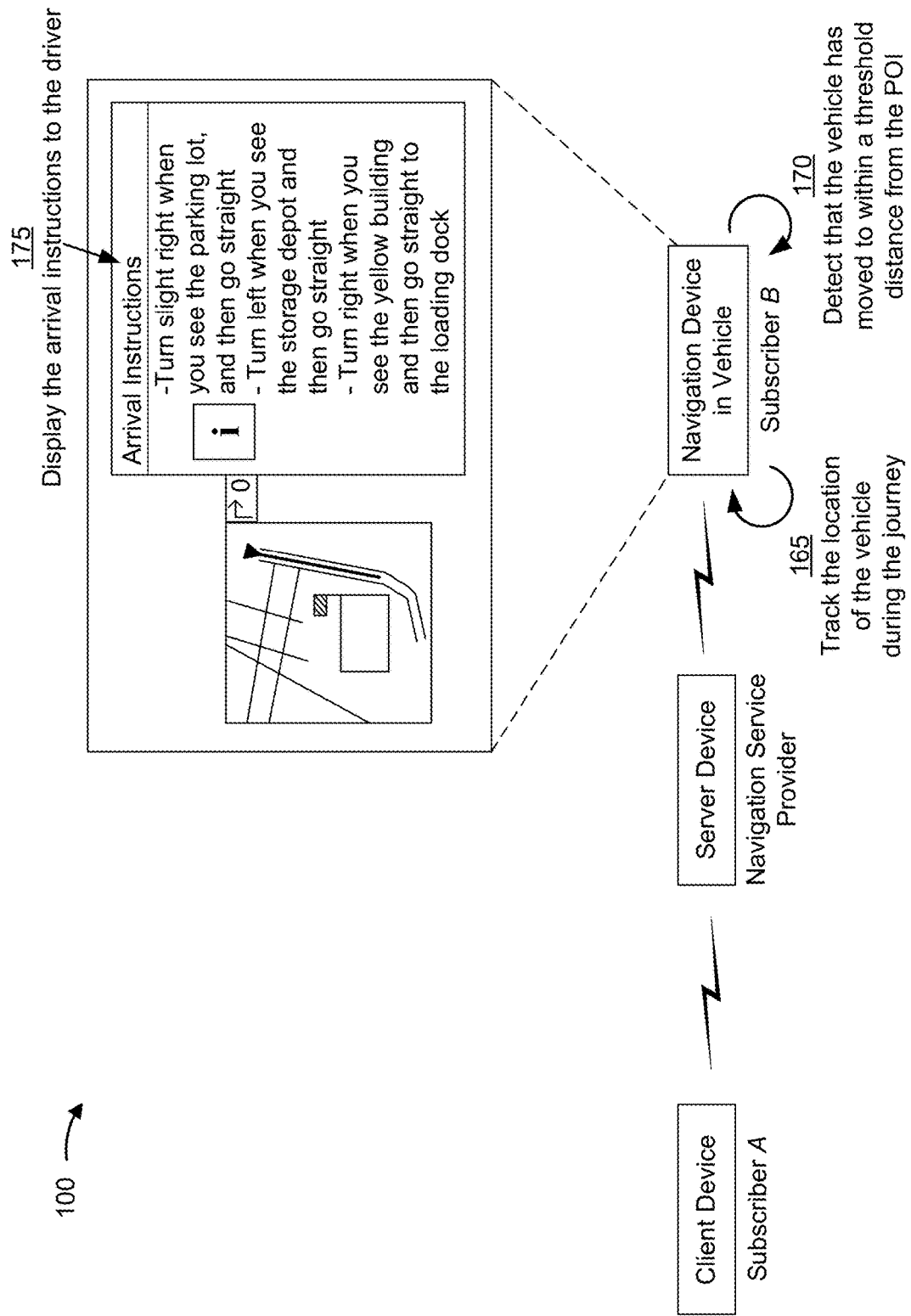

As shown in FIG. 1E, and as shown by reference number 165, the navigation device can (e.g., using a GPS receiver) track the location (e.g., continuously, periodically, and/or the like) of the vehicle during the journey. As shown by reference number 170, the navigation device can detect that the vehicle has moved to within a threshold distance from the POI. For example, the navigation device can detect that the vehicle has moved to within a short distance from the POI, such as to within a quarter of a kilometer, 500 meters, 100 meters, and/or the like from the POI. As shown by reference number 175, the navigation device can display the on-site information, particularly the arrival instructions, to the driver, which the driver can use as an aid to navigate through the POI to the final destination on-site (e.g., a loading dock, a pick-up area, and/or the like). Although not shown, the navigation device can additionally, or alternatively, audibly provide (e.g., via a speaker) the arrival instructions to the driver.

Additionally, or alternatively, and in some implementations, the server device can monitor the location of the vehicle during the journey (e.g., by receiving updates on the location of the vehicle from the navigation device), and can provide the on-site arrival instructions to the navigation device, based on the vehicle's location. For example, the server device can provide the on-site arrival instructions to the navigation device, when the vehicle has moved to within the threshold distance from the POI, to cause the navigation device to present the arrival instructions to the driver.

In this way, a server device can permit a subscriber, such as an owner and/or operator of a POI, to share on-site information associated with the POI, and permit other subscribers to access the shared on-site information for purposes of navigating to and/or through the POI. This permits the other subscribers to avoid any restricted areas that may be on-site, avoid any hazards that may be on-site, navigate paths that might not be well marked or well lit, and/or the like. In addition, this reduces or eliminates a need for a dispatcher to guide a driver through a site (thereby conserving resources, such as network resources, computer resources, communication resources, etc., that would otherwise need to be expended to provide on-site guidance to drivers), permits delivery personnel to utilize a best route when arriving at and/or departing from a POI (thereby reducing the risk of on-site accidents), conserves energy (e.g., fuel) that would otherwise be wasted from drivers driving around and searching for the best route at a POI, and/or conserves memory resources of a device associated with a driver (e.g., a navigation device in the vehicle) by reducing or eliminating a need for the device to pre-store POI data.

As indicated above, FIGS. 1A-1E are provided merely as an example. Other examples are possible and can differ from what was described with regard to FIGS. 1A-1E. Although some implementations were described with respect to sharing and providing on-site arrival instructions, the implementations described herein apply equally or similarly to sharing and providing other types of on-site information, such as on-site departure instructions.

Figure 2:
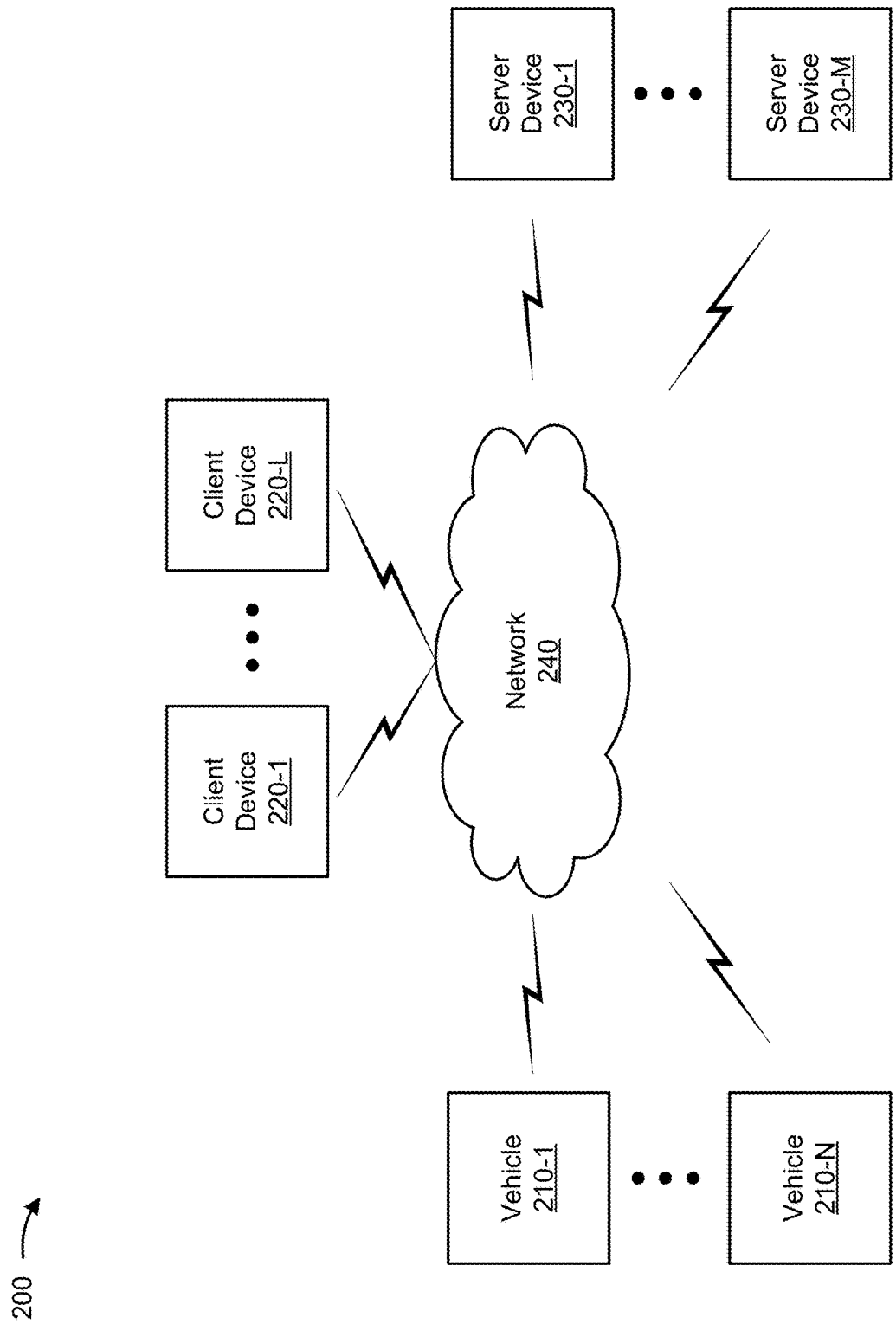
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more vehicles 210-1 through 210-N (N≥1) (hereinafter referred to collectively as "vehicles 210," and individually as "vehicle 210"), one or more client devices 220-1 through 220-L (L≥1) (hereinafter referred to collectively as "client devices 220," and individually as "client device 220"), one or more server devices 230-1 through 230-M (M≥1) (hereinafter referred to collectively as "server devices 230," and individually as "server device 230"), and a network 240. Devices of environment 200 can interconnect via wired connections, wireless connections, or a combination of wired and wireless connections.

Vehicle 210 includes a mobile machine (e.g., that transports people and/or cargo). For example, a vehicle can include a motor vehicle (e.g., a motorcycle, a bus, a car, a truck, etc.), a railed vehicle (e.g., a train or a tram), a watercraft (e.g., a ship, a boat, a submarine, etc.), an aircraft (e.g., a plane, a glider, or an unmanned aerial vehicle (UAV)), a spacecraft, an electric vehicle (e.g., an electric car or truck), a moped, a scooter, a bicycle, and/or the like. In some implementations, a vehicle can include an autonomous vehicle, such as an autonomous car, an autonomous boat, and/or the like. In some implementations, vehicle 210 can include a system (e.g., a telemetry system, a diagnostic system, a GPS system, such as a navigation device, etc.), client device 220, and/or the like that submits location search requests and/or provides data associated with vehicle 210 to server device 230, as described elsewhere herein. In practice, there can be thousands, millions, billions, etc. of vehicles 210 communicating data with client device 220 and/or server device 230, which can involve operations on data sets that cannot be managed manually or objectively by a human actor.

Client device 220 includes one or more devices capable of receiving, generating, storing, processing, and/or providing information associated with vehicle 210 and/or server device 230. For example, client device 220 can include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, client device 220 can provide data relating to a POI, and an indication to share the data, to server device 230, as described elsewhere herein. In practice, there can be thousands, millions, billions, etc. of client devices 220 communicating data with vehicle 210 and/or server device 230, which can involve operations on data sets that cannot be managed manually or objectively by a human actor.

Server device 230 includes one or more devices capable of receiving, storing, providing, generating, and/or processing information associated with vehicle 210 and/or client device 220. For example, server device 230 can include a server (e.g., a multi-server micro data center), a workstation computer, a virtual machine (VM) implemented by a computing device provided in a cloud computing environment, or a similar type of device. In some implementations, server device 230 can be related to a navigation service provider, and can provide one or more navigation services to subscribers, as described elsewhere herein. Each subscriber can be an entity, such as a person, a group of persons, an organization, a corporation, and/or the like, and can be related to zero or more client devices (e.g., a subset of client devices 220) and/or zero or more vehicles (e.g., a subset of vehicles 210), as described elsewhere herein. For example, one subscriber can be related to zero or more client devices 220 and/or zero or more vehicles 210, and another subscriber can be related to zero or more other client devices 220 and/or zero or more other vehicles 210. In some implementations, server device 230 can receive, from vehicle 210, one or more location search requests for POIs, and can provide shared data relating to the POIs, including on-site information, to vehicle 210, as described elsewhere herein. In practice, there can be thousands, millions, billions, etc. of server devices 230 communicating data with vehicle 210 and/or client device 220, which can involve operations on data sets that cannot be managed manually or objectively by a human actor.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
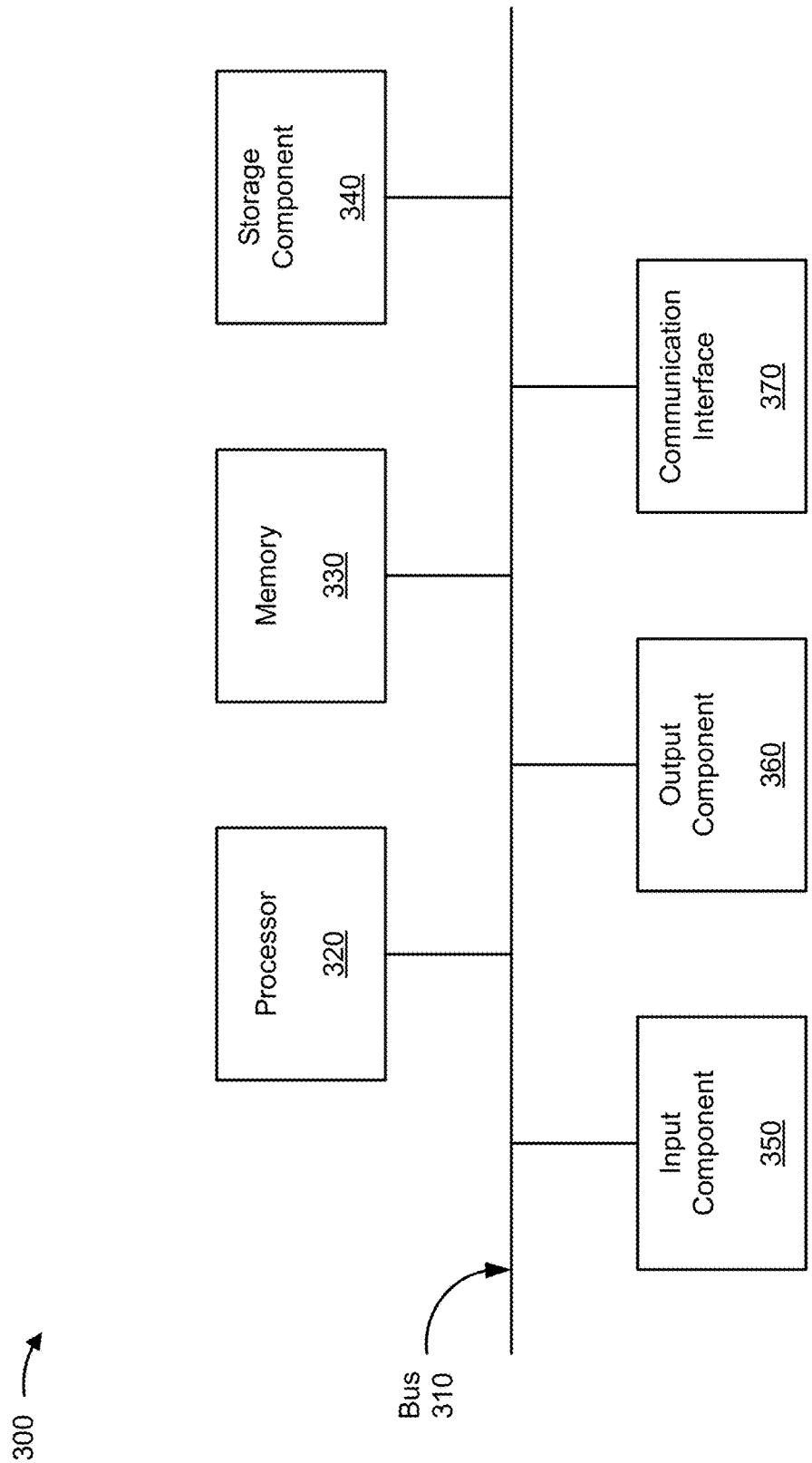
FIG. 3 is a diagram of example components of one or more devices of FIG. 2.

FIG. 3 is a diagram of example components of a device 300. Device 300 can correspond to vehicle 210, client device 220, and/or server device 230. In some implementations, vehicle 210 (or a device associated with vehicle 210), client device 220, and/or server device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB)

interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
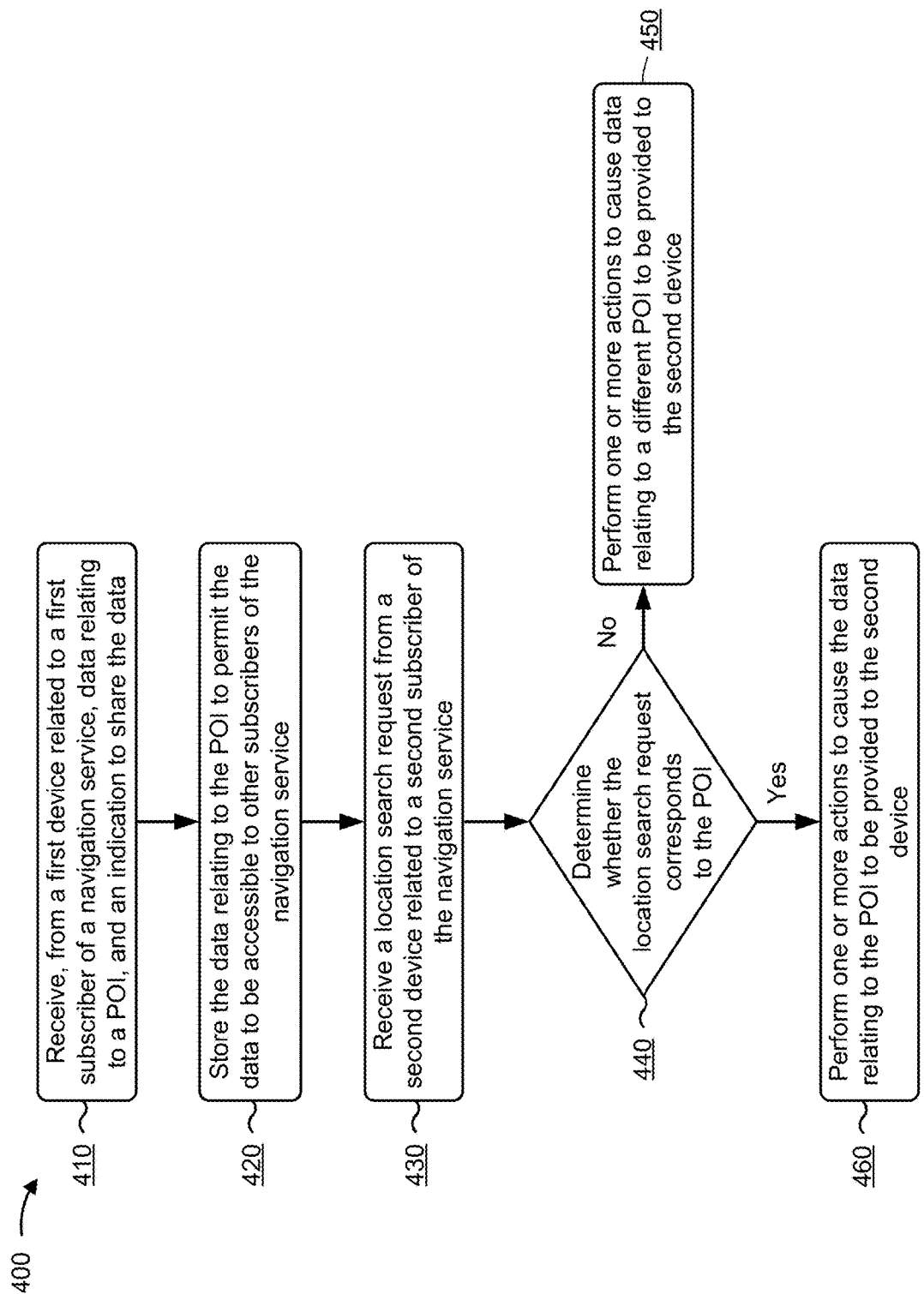
FIG. 4 is a flow chart of an example process for sharing point of interest data.

FIG. 4 is a flow chart of an example process 400 for sharing point of interest data. In some implementations, one or more process blocks of FIG. 4 can be performed by server device 230. In some implementations, one or more process blocks of FIG. 4 can be performed by another device or a group of devices separate from or including server device 230, such as vehicle 210 and client device 220.

As shown in FIG. 4, process 400 can include receiving, from a first device related to a first subscriber of a navigation service, data relating to a POI, and an indication to share the data (block 410). For example, server device 230 can receive, from a first device related to a first subscriber of a navigation service, data relating to a POI and an indication to share the data. In some implementations, server device 230 can receive thousands, millions, etc. of sets of data relating to POIs and/or thousands, millions, etc. of sets of indications to share such data. In this way, server device 230 can receive sets of data relating to POIs and/or sets of indications to share such data that cannot be processed manually or objectively by a human actor.

In some implementations, server device 230 can be related to a navigation service provider, and can provide the navigation service to subscribers. In some implementations, the first subscriber can be related to one or more of client devices 220 and/or zero or more of vehicles 210, and one or more second subscribers (e.g., one or more subscribers different than the first subscriber) can each be related to zero or more of client devices 220 and/or one or more of vehicles 210. In some implementations, and as described elsewhere herein, server device 230 can cause the data relating to the POI to be accessible to one or more subscribers based on the indication to share the data.

In some implementations, the data relating to the POI can include geodetic coordinates, a physical street address (e.g., 123 Main Street, etc.), geofence information, one or more road modifiers, on-site information, and/or the like. In some implementations, the on-site information can include on-site arrival instructions (e.g., instructions on how a driver is to navigate to and/or through the POI upon arrival, such as "enter the gate, pass the guard house, turn slight left and go straight until you reach the pick-up area"), on-site departure instructions (e.g., instructions on how a driver is to navigate through the POI when departing the POI, such as "make a right at the end of the loading dock area, proceed straight until you reach the storage depot, then turn left and proceed to the interstate"), on-site radio communication channel information, on-site access code information, on-site parking information, notes regarding the POI, advisories regarding the POI, and/or the like. In some implementations, the on-site arrival and/or departure instructions can include turn-by-turn instructions that provide route guidance to a driver based on the current location of a vehicle (e.g., vehicle 210). In some implementations, and in a case where vehicle 210 is an autonomous vehicle, server device 230 can generate one or more turn-by-turn instructions, based on the on-site information (e.g., the on-site arrival instructions and/or the on-site departure instructions), and can provide the one or more instructions to the autonomous vehicle for use with navigating through the POI.

In some implementations, server device 230 can receive the data and/or the indication to share the data based on input (e.g., to a user interface) from a user of client device 220, a device (e.g., a navigation device) associated with vehicle 210, and/or the like. For example, server device 230, and/or a related device, can provide, to client device 220, a user interface that includes one or more functions that permit a user to create data relating to POIs, edit the data, and/or provide the data and/or an indication to share the data to server device 230. Additionally, or alternatively, and in some implementations, server device 230 can receive data relating to the POI that has been created using a system or tool different from the user interface. In this case, for example, a user can provide the data (e.g., in the form of a POI file) to the user interface for transmission (e.g., upload) to server device 230.

In some implementations, the user interface can provide one or more fields for inputting data relating to a POI. For example, the user interface can provide one or more fields for inputting a physical street address, geodetic coordinates, geofence information, road modifier information, on-site information, and/or the like. In some implementations, the user interface can provide an interactive geographical map (e.g., showing streets, roads, buildings, etc.) for selecting and/or viewing the POI. In some implementations, the user interface can permit a user to zoom in and/or out of the map.

In some implementations, the user interface can permit a user to provide one or more inputs to the map (e.g., by drawing on the map and/or the like) to define one or more routes for navigating through the POI (e.g., upon arrival at and/or when departing from the POI). In this case, for example, client device 220 and/or server device 230 can generate, based on the user's input(s), turn-by-turn instructions that can provide route guidance to a driver while on-site.

In some implementations, the user interface can provide one or more user selectable options (e.g., via a menu, as a checkbox, and/or the like) to share the data relating to the POI.

In some implementations, the user interface can provide one or more user selectable options that permit a user to indicate one or more items of data relating to the POI that are to be shared and/or one or more items of data relating to the POI that are not to be shared. Additionally, or alternatively, the user interface can provide different input fields for items of data that are to be shared and items of data that are not to be shared. In either case, for example, this permits a subscriber (and/or a user associated with the subscriber) to distinguish items of data that the subscriber (and/or the user) wants to keep private (e.g., internal access code information, internal radio channel information, and/or the like) from items of data that can be shared with other subscribers (e.g., on-site arrival and/or departure instructions). In some implementations, the indication to share the data relating to the POI can include an indication that only a portion of the data is to be shared. In this case, for example, server device 230 can cause only the items of data that are to be shared to be accessible to other subscribers.

In some implementations, after server device 230 receives the data relating to the POI, and the indication to share the data, server device 230 can detect one or more insufficiencies with the data, and can provide feedback to client device 220 regarding the insufficiencies. In some implementations, server device 230 can cause the user interface on client device 220 to prompt a user of client device 220 to address (e.g., correct or cure) the insufficiencies. For example, server device 230 can detect that the data lacks a data identifier (e.g., lacks a POI ID, such as "s100") for the POI, that the data lacks on-site information (e.g., on-site arrival and/or departure instructions) for the POI, and/or the like. Continuing the example, server device 230 can require and/or suggest that one or more of the insufficiencies be addressed before causing the data to be accessible to other subscribers. In this way, server device 230 enforces data quality and ensures that other subscribers will have access to sufficient and/or complete information for the POI.

In some implementations, the indication to share the data can include a designation of one or more other subscribers (and/or users associated with the one or more subscribers) of the navigation service with whom the data is to be shared. For example, the user interface can permit a user to input information (e.g., a name, a subscriber identifier, a user identifier, and/or the like) identifying one or more subscribers (and/or users associated with the subscribers) that are to be given access to the data. Continuing the example, server device 230 can, based on the inputted information, cause the shared data to be accessible to the designated subscribers (and/or users), but not to other subscribers (or users associated with other subscribers).

In some implementations, server device 230 can receive the indication to share the data from a device different than the first device. For example, server device 230 can pre-store one or more settings relating to sharing of POI data (e.g., as set by subscribers and/or users associated with the subscribers), and can determine an indication to share POI data based on the setting(s).

In some implementations, server device 230 can automatically share POI data without receiving an indication to share the data. In some implementations, server device 230 can automatically share POI data, by default, based on one or more settings selected by a subscriber. In some implementations, server device 230 can store the one or more settings in an account associated with the subscriber. In this case, for example, an indication to share POI data may not be necessary and may not be received (e.g., from the first device). Additionally, and continuing the example, no option may be provided to the subscriber, or to a user associated with the subscriber, to share POI data.

Additionally, or alternatively, service device 230 can disable sharing of POI data for a subscriber (e.g., based on one or more settings selected by the subscriber). In a case where the subscriber is a group of persons, an organization, a corporation, or the like, server device 230 can disable sharing for all users associated with the subscriber (e.g., sharing can be disabled for the subscriber's account and/or for any individual subaccounts relating to users associated with the subscriber).

Additionally, or alternatively, and in some implementations, server device 230 can prompt a subscriber (and/or a user associated with the subscriber) with the option to share POI data (e.g., based on one or more settings selected by the subscriber). In a case where the subscriber is a group of persons, an organization, a corporation, or the like, server device 230 can prompt the subscriber and/or each user associated with the subscriber (or certain users associated with the subscribers, e.g., as selected by the subscriber) with the option to share POI data. In some implementations, server device 230 can provide the prompt upon detecting the initiation of POI data creation at the user interface of client device 220, upon detecting certain POI data, such as on-site information, being inputted to the user interface for a POI, upon detecting that POI data is being submitted by the user interface to server device 230, and/or the like.

In this way, server device 230 can receive, from a first device related to a first subscriber of a navigation service, data relating to a POI, and possibly an indication to share the data, to cause server device 230 to store the data relating to the POI and/or to permit the data to be accessible to other subscribers of the navigation service.

As further shown in FIG. 4, process 400 can include storing the data relating to the POI to permit the data to be accessible to other subscribers of the navigation service (block 420). For example, server device 230 can store the data relating to the POI to permit the data to be accessible to other subscribers of the navigation service. In some implementations, server device 230 can store the data to permit the data to be accessible to other subscribers based on the indication to share the data. In some implementations, server device 230 can store data after receiving the data, periodically, according to a schedule, and/or the like. In some implementations, server device 230 can store thousands, millions, etc. of sets of data relating to POIs. In this way, server device 230 can store sets of data that cannot be processed manually or objectively by a human actor.

In some implementations, the other subscribers can be different than the first subscriber. In some implementations, a subscriber different than the first subscriber can be related to a subset of client devices 220 that is different than a subset of client devices 220 related to the first subscriber and/or can be related to a subset of vehicles 210 that is different than a subset of vehicles related to the first subscriber, as described elsewhere herein. In this case, for example, server device 230 can store the data relating to the POI such that the data is accessible to the devices and/or vehicles related to the different subscriber(s).

In some implementations, server device 230 can store the data relating to the POI in a data structure (e.g., located in, or remotely, from server device 230). In some implementations, server device 230 can cause the data in the data structure to be accessible to searching by other subscribers (e.g., by applying one or more settings to one or more fields in the data structure that flag the data as being accessible to searching by other subscribers). For example, server device 230 can receive, from a device (e.g., vehicle 210) related to a second subscriber different than the first subscriber, a location search request for data relating to the POI. Continuing the example, server device 230 can, based on the location search request and the data being accessible to searching by other subscribers, obtain the data from the data structure, and provide the data to the device related to the second subscriber.

Additionally, or alternatively, the data structure can, by default (e.g., as configured by a user, such as a system administrator), be accessible to searching by other subscribers. In this case, for example, shared data can be accessible to searching by other subscribers by virtue of the data being stored in the data structure.

In some implementations, server device 230 can cause only a portion of the shared data in the data structure to be accessible to searching by other subscribers. For example, where the indication to share the data includes an indication that only a portion of the data is to be shared (as described elsewhere herein, e.g., with respect to block 410), server device 230 can apply one or more settings to one or more fields in the data structure to specify item(s) of the data that are to be accessible to searching by other subscribers, and item(s) of the data that are not to be accessible to other subscribers. In this way, server device 230 can restrict other subscribers from accessing any data relating to the POI that the first subscriber does not want to share.

In some implementations, server device 230 can provide a notification to other subscribers (e.g., to one or more client devices 220 and/or vehicles 210 related to the other subscribers) regarding the availability of shared data. In some implementations, server device 230 can provide the other subscribers the option of accessing and/or using the shared data.

As one example, a second subscriber, different than the first subscriber, may want to create (e.g., via a user interface provided on client device 220, as described elsewhere herein) data relating to a POI, but may be unaware that shared data for the same POI already exists. Continuing the example, server device 230 can detect that the second subscriber is in the process of creating (and/or providing) data relating to the POI, and can provide a notification to the second subscriber regarding the availability of shared data for the same POI and/or provide the option for the second subscriber to access, edit, and/or use the shared data.

As another example, the second subscriber may have previously created (and/or provided to server device 230) data relating to a POI. Continuing this example, server device 230 can, after receiving, from the first device, the indication to share the data relating to the same POI (and/or after storing the shared data to permit the shared data to be accessible to other subscribers), provide a notification to the second subscriber regarding the availability of the shared data and/or provide the option for the second subscriber to access, edit, and/or use the shared data.

In some implementations, and further continuing the two previous examples, server device 230 can merge and/or copy some or all of the shared data relating to the POI (e.g., the physical address, geodetic coordinates, geofence information, road modifier information, on-site information, and/or the like) to the second subscriber's set of data for the POI. In this way, the second subscriber is permitted to maintain (e.g., on server device 230) the second subscriber's own set of data for the POI, which can include the second subscriber's own information relating to the POI (such as access code information, paper work and/or signature requirements, and/or the like), while gaining the benefit of the first subscriber's shared data, such as on-site arrival and/or departure instructions. Additionally, the second subscriber is permitted to maintain the second subscriber's own set of data relating to the POI using the second subscriber's own data identifier (e.g., the second subscriber's own POI ID), which reduces or eliminates a need for the second subscriber to learn and/or utilize the data identifier (e.g., POI ID) of the shared data, since different subscribers may use different numbering schemes for the data identifier.

Additionally, or alternatively, and further continuing the two previous examples, server device 230 can permit the second subscriber to establish a reference (e.g., by selecting a menu option or checkbox, and/or the like) that points the second subscriber's set of data for the POI to the shared data. In this way, the second subscriber can search for the POI (e.g., via a location search request to server device 230) using the second subscriber's own data identifier (which reduces or eliminates a need for the second subscriber to learn and/or utilize the data identifier of the shared data), and yet still be able to obtain the shared data by virtue of the reference.

In some implementations, server device 230 can require subscribers to have an upgraded subscription in order to access shared data. In this case, for example, server device 230 can prompt a subscriber to obtain an upgraded subscription and/or can provide an option for the subscriber to accept the upgraded subscription. In some implementations, server device 230 can prevent a subscriber from accessing any shared data until the subscriber's subscription has been upgraded.

In some implementations, a subscriber can be a group of persons, an organization, a corporation, or the like. In this case, the subscriber can have a single subscriber account with the navigation service provider, where all users associated with the subscriber (e.g., employees, such as site managers, drivers, and/or the like) can access the navigation service via the subscriber account. In such a case, sharing of POI data between users associated with the subscriber would be unnecessary, since POI data created and/or stored for the subscriber's account would be accessible to all users associated with the subscriber (e.g., accessible via one or more client devices 220 related to the subscriber and/or one or more vehicles 210 related to the subscriber). In some implementations, the subscriber and/or a user associated with the subscriber can nevertheless share POI data with one or more other subscribers (and/or with one or more users associated with such other subscribers).

Additionally, or alternatively, in a case where a subscriber is a group of persons, an organization, a corporation, or the like, users associated with the subscriber can have one or more individual accounts with the navigation service provider (e.g., subaccounts under a main account associated with the subscriber). In this case, the subscriber can create POI data separate from that of users associated with the subscriber, and each user associated with the subscriber can create POI data separate from that of the subscriber and/or other users associated with the subscriber. In such a case, server device 230 can permit the subscriber to share POI data with one or more users associated with the subscriber, and/or can permit a user associated with the subscriber to share POI data with the subscriber and/or with other users associated with the subscriber. Additionally, or alternatively, server device 230 can permit the subscriber and/or a user associated with the subscriber to share POI data with one or more other subscribers (and/or with one or more users associated with such other subscribers).

In this way, server device 230 can store the data relating to the POI to permit the data to be accessible to other subscribers of the navigation service, to permit server device 230 to service a location search request from a second device related to a second subscriber of the navigation service.

As further shown in FIG. 4, process 400 can include receiving a location search request from a second device related to a second subscriber of the navigation service (block 430). For example, server device 230 can receive a location search request from a second device related to a second subscriber of the navigation service. In some implementations, server device 230 can receive the location search request based on input (e.g., to a user interface) from a user of client device 220, a device (e.g., a navigation device) associated with vehicle 210, and/or the like. In some implementations, server device 230 can receive a location search request after storing data relating to a POI, periodically, according to a schedule, and/or the like. In some implementations, server device 230 can receive thousands, millions, billions, etc. of location search requests. In this way, server device 230 can process location search requests that cannot be processed manually or objectively by a human actor.

In some implementations, the second subscriber can be different than the first subscriber. In some implementations, the second device can be a navigation device (e.g., a GPS receiver) located in a vehicle 210. For example, the second device can be a navigation device located in a vehicle that is in a subset of vehicles 210 related to the second subscriber.

In some implementations, the location search request can include one or more search terms that server device 230 can use to search for relevant POI data. As one example, the one or more search terms can include a data identifier (e.g., POI ID "s100") associated with data relating to a POI. Additionally, or alternatively, and as another example, the one or more search terms can include a physical address of the POI, geodetic coordinates of the POI, a name of a subscriber (e.g., a subscriber identifier), a name of a subscriber and a data identifier presented in a format decipherable by server device 230 (e.g., "sample-retail-chain-name/identifier: s100"), and/or the like.

In this way, server device 230 can receive a location search request from a second device related to a second subscriber of the navigation service, to cause server device 230 to determine whether the location search request corresponds to the POI.

As further shown in FIG. 4, process 400 can include determining whether the location search request corresponds to the POI (block 440). For example, server device 230 can determine whether the location search request corresponds to the POI. In some implementations, server device 230 can determine whether a location search request corresponds to a POI after receiving a location search request, periodically, according to a schedule, and/or the like. In some implementations, server device 230 can determine the relations of thousands, millions, billions, etc. of location search requests to POIs. In this way, server device 230 can determine the relations of location search requests to POIs that cannot be performed manually or objectively by a human actor.

In some implementations, server device 230 can determine whether the location search request corresponds to the POI by processing one or more search terms included in the location search request. For example, server device 230 can extract text from the location search request, can perform a search (as described elsewhere herein, e.g., with respect to blocks 420 and 430) based on the extracted text, and can determine whether the POI is a match. Additionally, or alternatively, in a case where the location search request includes one or more voice-based commands, server device 230 can perform speech-to-text conversion and/or the like, prior to performing the search.

In some implementations, server device 230 can search the data structure(s) and/or determine whether the POI is a match based on a search algorithm that looks for exact (or direct) matches, a search algorithm that looks for close matches, and/or a search algorithm that utilizes fuzzy logic to look for matches. For example, where the location search request includes the string "s100," server device 230 can search one or more data structures for data associated with the string "s100" (e.g., for data where the data identifier includes the string "s100," for data where a name or description of the POI includes the string "s100," and/or the like). As another example, server device 230 can consider stored data associated with the identifier "s100" to be a match, or possible match, to a location search request containing a string "s 100" (i.e., with a space between 's' and '100'). As yet another example, server device 230 can consider stored data associated with the identifier "s100" to be a match, or possible match, to a location search request containing the string "store 100," "s101," or "store 101."

In this way, server device 230 can determine whether the location search request corresponds to the POI, to cause server device 230 to perform one or more actions to cause the data relating to the POI to be provided to the second device, or to perform one or more actions to cause data relating to a different POI to be provided to the second device.

As further shown in FIG. 4, if the location search request does not correspond to the POI (block 440—NO), process 400 can include performing one or more actions to cause data relating to a different POI to be provided to the second device (block 450). For example, server device 230 can perform one or more actions to cause data relating to a different POI to be provided to the second device. In some implementations, server device 230 can perform the one or more actions after determining that a location search request does not correspond to a POI, periodically, according to a schedule, and/or the like. In some implementations, server device 230 can perform thousands, millions, billions, etc. of actions with respect to data relating to POIs. In this way, server device 230 can perform actions with respect to data relating to POIs that cannot be performed manually or objectively by a human actor.

In some implementations, server device 230 can determine that the location search request corresponds to a different POI (e.g., based on determining that search term(s) included in the location search request match data, stored in a data structure, relating to the different POI). In this case, server device 230 can obtain data relating to the different POI (e.g., from the data structure), and provide the data relating to the different POI to the second device.

As further shown in FIG. 4, if the location search request corresponds to the POI (block 440—YES), process 400 can include performing one or more actions to cause the data relating to the POI to be provided to the second device (block 460). For example, server device 230 can perform one or more actions to cause the data relating to the POI to be provided to the second device. In some implementations, server device 230 can perform the one or more actions after determining that a location search request corresponds to a POI, periodically, according to a schedule, and/or the like. In some implementations, server device 230 can perform thousands, millions, billions, etc. of actions with respect to data relating to POIs. In this way, server device 230 can perform actions with respect to data relating to POIs that cannot be performed manually or objectively by a human actor.

In some implementations, server device 230 can perform one or more actions to cause the data relating to the POI to be obtained from a data structure. For example, server device 230 can, after determining that the location search request corresponds to the data relating to the POI, obtain, from a data structure, some or all of the data relating to the POI, such as the physical address of the POI, the geodetic coordinates of the POI, geofence information relating to the POI, road modifier information relating to the POI, on-site information regarding the POI (e.g., arrival and/or departure instructions), and/or the like. In some implementations, server device 230 can perform one or more actions to cause some or all of the obtained data to be provided to the navigation device in vehicle 210, which the navigation device can present (e.g., visually, audibly, and/or the like) to a user (e.g., a driver).

Additionally, or alternatively, and in some implementations, server device 230 can perform one or more actions to cause the navigation device in vehicle 210 to present, to a user (e.g., a driver) and when one or more conditions are satisfied, certain data relating to the POI. In some implementations, the one or more conditions can include the vehicle 210 moving to within a threshold distance from the POI (e.g., to within a quarter of a kilometer, 500 meters, and/or the like, from the POI), which can be a suitable time for the navigation device to present on-site information, such as arrival instructions, to the driver. In some implementations, server device 230 can specify (e.g., via an identifier, a flag, a tag, and/or the like), to the navigation device in vehicle 210, the arrival instructions included in the data relating to the POI. In this case, for example, the navigation device in vehicle 210 can, based on the specified arrival instructions, identify and/or extract the arrival instructions from the data relating to the POI, and cause the arrival instructions to be presented to the user when vehicle 210 has moved to within the threshold distance from the POI.

Additionally, or alternatively, in a case where vehicle 210 proceeds away from the POI, after having moved to within the threshold distance from the POI, the navigation device can continue to monitor the location of vehicle 210, and can provide route guidance to the user (e.g., driver) to return to the POI. In this case, for example, when vehicle 210 returns to within the threshold distance from the POI, the navigation device can present the on-site information (e.g., arrival instructions) again to the user.

In some implementations, the one or more conditions can include the vehicle 210 exiting a virtual perimeter of an area (e.g., a commercial yard) at the POI, which can be a suitable time for the navigation device to present on-site information, such as departure instructions, to a user (e.g., the driver). In some implementations, server device 230 can specify (e.g., via one or more identifiers, flags, tags, and/or the like), to the navigation device in vehicle 210, the departure instructions and information regarding the virtual perimeter included in the data relating to the POI. In this case, for example, the navigation device in vehicle 210 can, based on the specified departure instructions and the information regarding the virtual perimeter, identify and/or extract the departure instructions and the information regarding the virtual perimeter from the data relating to the POI, and cause the departure instructions to be presented to the user when vehicle 210 is exiting the virtual perimeter.

Additionally, or alternatively, and in some implementations, server device 230 can monitor the location of vehicle 210 during the journey, and can provide the on-site arrival and/or departure instructions to the navigation device, based on the vehicle's location (as described elsewhere herein). For example, server device 230 can provide the on-site arrival instructions to the navigation device, when the vehicle has moved to within the threshold distance from the POI, to cause the navigation device to present the arrival instructions to the driver. As another example, server device 230 can provide the on-site departure instructions to the navigation device, when vehicle 210 exits the virtual perimeter, to cause the navigation device to present the departure instructions to the driver.

In some implementations, the navigation device in vehicle 210 (and/or server device 230) can repeat the presentation of on-site information, such as arrival and/or departure instructions. For example, in a case where the arrival and/or departure instructions were visually and/or audibly provided to the driver, and where the driver wants to view and/or hear the message again, the navigation device can visually and/or audibly provide the instructions again. In some implementations, the navigation device in vehicle 210 can repeat the presentation of the on-site information based on input from a user of the navigation device. For example, the navigation device can provide a user selectable option on the user interface that permits a user to request the arrival and/or departure instructions to be repeated. Additionally, or alternatively, and as another example, the navigation device can accept a voice-based command to request the arrival and/or departure instructions to be repeated.

In some implementations, server device 230 can permit a user (e.g., the second subscriber) to provide communications and/or feedback to the first subscriber. For example, the navigation device in vehicle 210 can provide one or more input fields that permit a user to input feedback for the first subscriber. For example, where the first subscriber employs a freight company (e.g., a second subscriber) to perform a delivery at one of the first subscriber's store locations, a driver for the freight company may want to inform the first subscriber regarding any completed deliveries (e.g., that a trailer has been dropped at the POI), inform the subscriber of any corrections that are to be made to any of the shared data (e.g., updates that are to be made to the on-site arrival and/or departure instructions, and/or the like), and/or the like. Continuing the example, server device 230 can forward the communications to the first subscriber, such as via e-mail, text message, and/or the like.

In this way, server device 230 can perform one or more actions to cause the data relating to the POI to be provided to the second device.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5A:
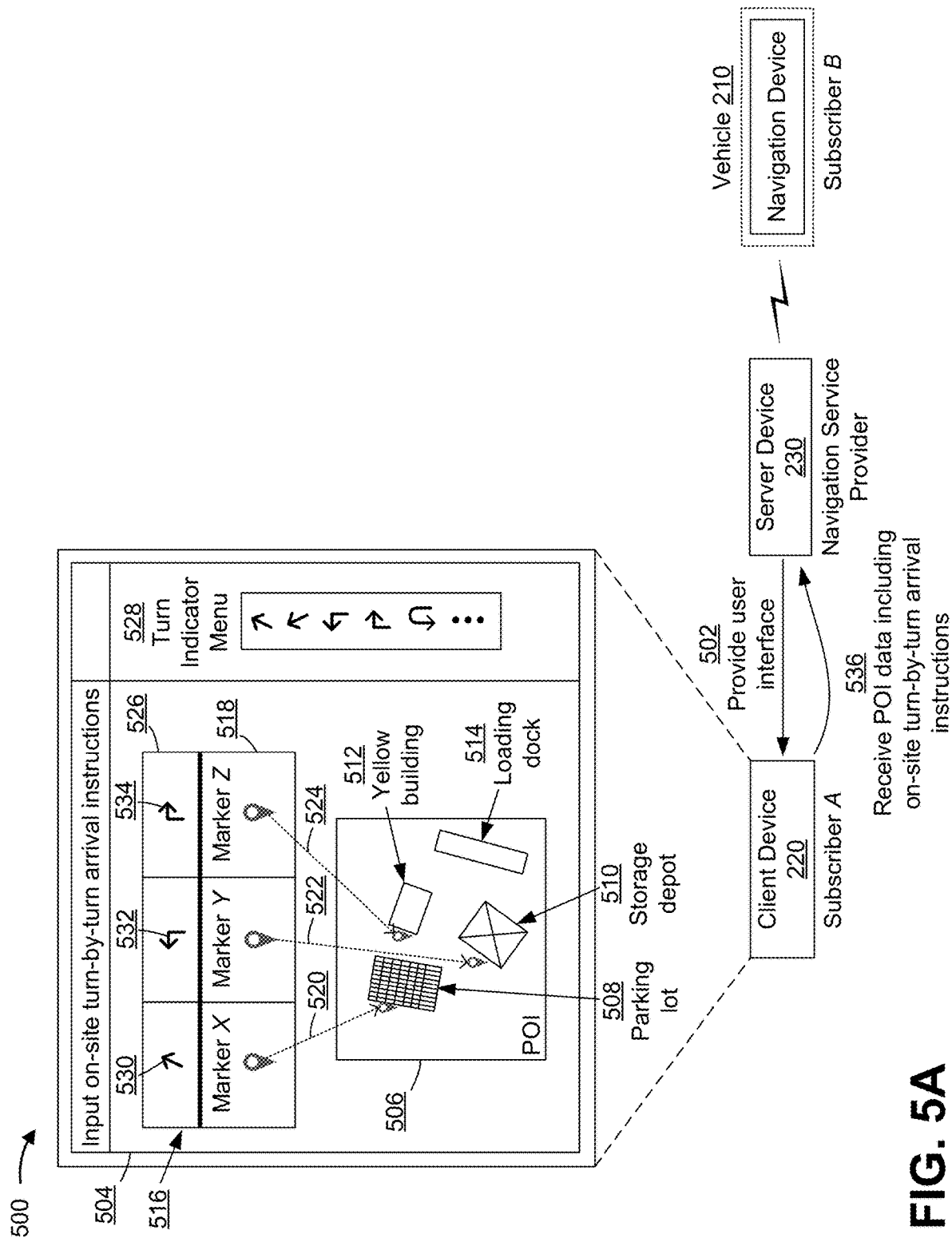
FIGS. 5A and 5B are diagrams of an example implementation relating to the example process shown in FIG. 4.
Figure 5B:
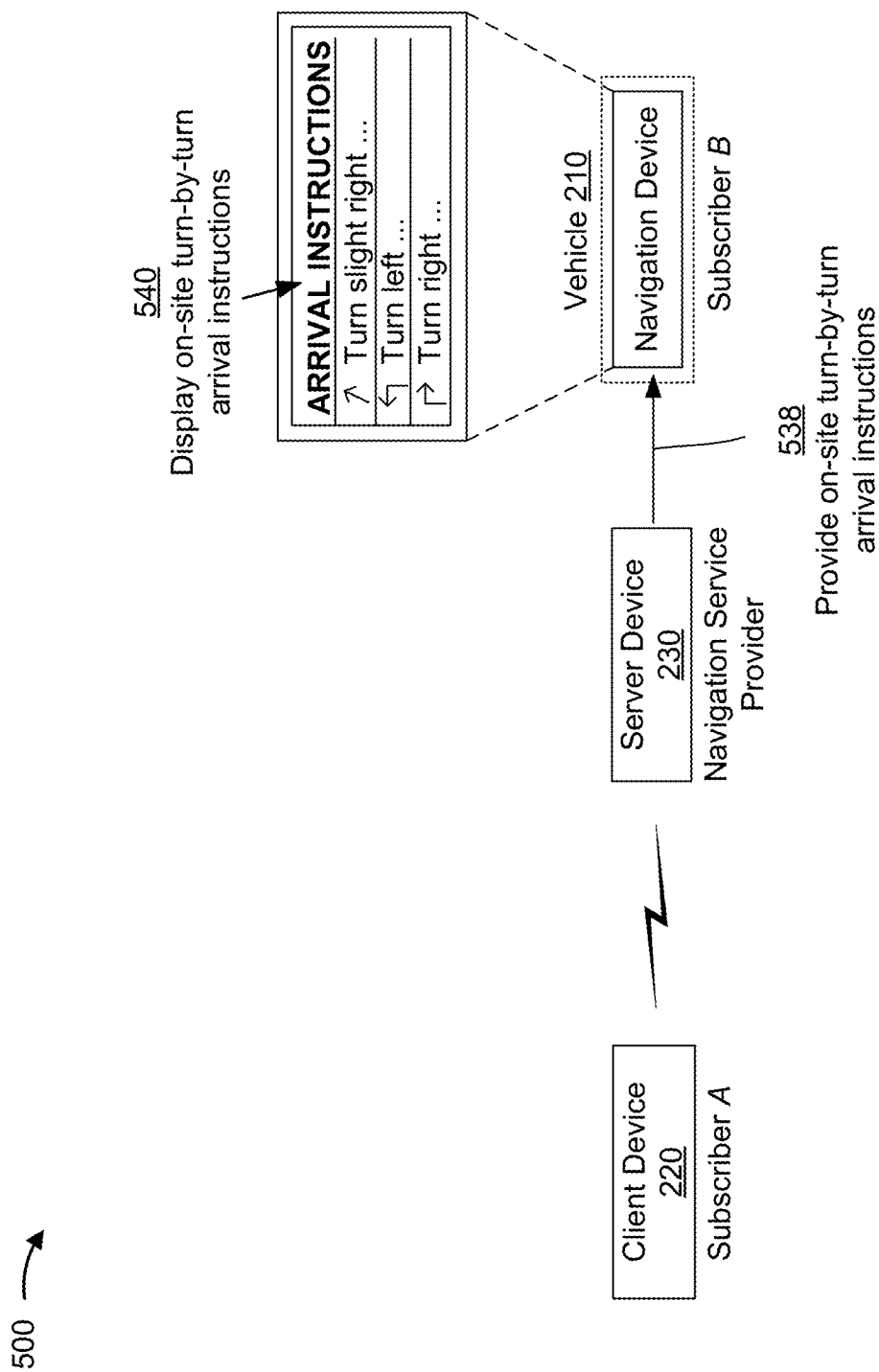

FIGS. 5A and 5B are diagrams of an example implementation 500 relating to example process 400 shown in FIG. 4. FIGS. 5A and 5B show an example of server device 230 receiving, from client device 220 related to a subscriber A, data relating to a POI, including on-site turn-by-turn arrival instructions, and providing, the instructions to a navigation device in vehicle 210 related to a subscriber B.

As shown in FIG. 5A, and as shown by reference number 502, server device 230 can provide a user interface 504 for display on client device 220. User interface 504 can be similar to one or more user interfaces described elsewhere herein. For example, user interface 504 can include one or more of the POI data creation and/or editing capabilities provided by the user interface described above with respect to FIG. 1A.

As shown in FIG. 5A, user interface 504 can provide an interactive geographical map 506 that displays one or more images of an on-site area at a POI. For example, map 506 can display one or more satellite-based images portraying the on-site layout of the POI and/or the structures located on-site, such as buildings, parking areas, and/or the like. As shown in FIG. 5A, a parking lot 508, a storage depot 510, a yellow building 512, and a loading dock 514 can be located on-site at the POI.

As shown in FIG. 5A, user interface 504 can provide an instruction input field 516 that permits a user to input on-site turn-by-turn arrival instructions. As shown, instruction input field 516 can include a marker input field 518 that permits a user to define, based on an on-site layout of the POI and/or based on one or more on-site structures, one or more beacons to use for turn-by-turn navigation purposes. As shown by reference number 520, and as an example, a user can select a marker X to associate with parking lot 508 on map 506 to define parking lot 508 as a first beacon. The user can select the marker and make the association by taking one or more actions, such as clicking, tapping, dragging, dropping, and/or the like. As shown by reference number 522, and as an example, the user can select a marker Y to associate with storage depot 510 on map 506 to define storage depot 510 as a second beacon. As shown by reference number 524, and as an example, the user can select a marker Z to associate with yellow building 512 on map 506 to define yellow building 512 as a third beacon.

As shown in FIG. 5A, instruction input field 518 can include a turn indicator input field 526 that permits a user to associate a turn indicator for each selected marker. As shown, user interface 504 can include a turn indicator selection menu 528 that permits a user to select turn indicators (e.g., a turn left indicator, a turn right indicator, a turn slight left indicator, a turn slight right indicator, a go straight indicator, a U-turn indicator, and/or the like) for turn indicator input field 526. As shown, and as an example, the user can select a slight right turn indicator 530 to associate with marker X for parking lot 508. As shown, and as an example, the user can select a left turn indicator 532 to associate with marker Y for storage depot 510. As shown, and as an example, the user can select a right turn indicator 534 to associate with marker Z for yellow building 512. In this case, the on-site turn-by-turn arrival instructions can include turning slight right at parking lot 508 and proceeding straight, turning left at storage depot 510 and proceeding straight, and turning right at yellow building 512 and proceeding straight until the final destination (e.g., loading dock 514) is reached.

As shown by reference number 536, server device 230 can receive data relating to the POI, including on-site turn-by-turn arrival instructions, from client device 220. For example, server device 230 can receive the on-site turn-by-turn arrival instructions inputted via user interface 504 of client device 220, as described above.

As shown in FIG. 5B, and as shown by reference number 538, server device 230 can provide the on-site turn-by-turn arrival instructions to the navigation device in vehicle 210. As shown by reference number 540, the navigation device can cause the on-site turn-by-turn arrival instructions to be displayed to the driver (e.g., when vehicle 210 has moved to within a threshold distance from the POI, as described elsewhere herein) as route guidance information.

As an addition, or an alternative, to permitting a user to select markers and turn indicators to define on-site turn-by-turn instructions, user interface 504 can permit a user to draw on map 506, as described elsewhere herein, to define some or all of the turn-by-turn instructions.

In this way, server device 230 can permit a subscriber to share on-site turn-by-turn arrival instructions with other subscribers, which can aid the other subscribers in navigating through the POI upon arrival.

As indicated above, FIGS. 5A and 5B are provided merely as an example. Other examples are possible and can differ from what was described with regard to FIGS. 5A and 5B. Although some implementations were described with respect to arrival instructions (e.g., on-site turn-by-turn arrival instructions), the implementations described herein apply equally or similarly to departure instructions (e.g., on-site turn-by-turn departure instructions).

Some implementations, described herein, provide a device (e.g., a server device) that is capable of permitting a subscriber to create, store, and/or share the subscriber's POI data with other subscribers. In some implementations, described herein, the device is capable of causing certain shared POI data, such as on-site information regarding arrival at the POI and/or departure from the POI, to be provided to another subscriber. In this way, other subscribers can utilize the shared data to avoid any restricted areas that may be on-site, avoid any hazards that may be on-site, and/or the like. In addition, this reduces or eliminates a need for a dispatcher to guide a driver through a site, permits delivery personnel to utilize a best route when arriving at and/or departing from a POI (thereby reducing the risk of on-site accidents), and/or conserves memory resources of a device associated with a driver (e.g., a navigation device in the vehicle) by reducing or eliminating a need for the device to pre-store POI data.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A server device, comprising:
one or more memories; and
one or more processors, communicatively coupled to the one or more memories, configured to:
receive, from a first device related to a first subscriber of a navigation service, data relating to a POI, and an indication to share the data, the POI including one or more buildings, the data including:
on-site information associated with the POI, and
information regarding a virtual perimeter of an area at the POI,
wherein the on-site information includes:
at least one of:
one or more instructions regarding arrival at the POI, or
one or more instructions regarding departure from the POI,
and
at least two of:
on-site radio communication channel information,
on-site access code information, or
on-site parking information;
store the data relating to the POI to permit the data to be accessible to other subscribers of the navigation service;
receive a location search request from a second device related to a second subscriber of the navigation service,
the second subscriber being a different user than the first subscriber;
determine that the location search request corresponds to the POI; and
perform one or more actions to cause the data relating to the POI to be provided to the second device,
wherein the one or more processors, when performing the one or more actions, are configured to specify, to the second device, the one or more instructions regarding the departure from the POI and the information regarding the virtual perimeter to permit the second device to identify the one or more instructions regarding the departure from the POI to be presented to the second subscriber when the second device exits the virtual perimeter.

2. The server device of claim 1, wherein the data relating to the POI further includes:
geodetic coordinates associated with the POI,
a physical street address of the POI,
or
road modifier information associated with the POI.

3. The server device of claim 1, wherein the one or more processors, when storing the data relating to the POI to permit the data to be accessible to the other subscribers of the navigation service, are configured to:
store the data in a data structure to permit the data to be searchable by the other subscribers.

4. The server device of claim 1, wherein the location search request includes:
a data identifier associated with the POI, or
a subscriber identifier associated with the first subscriber.

5. The server device of claim 4, wherein the one or more processors, when determining that the location search request corresponds to the POI, are configured to:
determine that the location search request corresponds to the POI based on the data identifier or the subscriber identifier included in the location search request.

6. The server device of claim 4, wherein the one or more processors are further configured to:
permit the second subscriber to provide communications to the first subscriber; and
forward the communications to the first subscriber.

7. The server device of claim 1, wherein the on-site information includes the one or more instructions regarding the arrival at the POI, and
wherein the one or more processors, when performing the one or more actions to cause the data relating to the POI to be provided to the second device, are configured to:
perform one or more actions to specify, to the second device, the one or more instructions regarding the arrival at the POI, to permit the second device to identify the one or more instructions regarding the arrival at the POI to be presented to the second subscriber when the second device has moved to within a threshold distance from the POI.

8. A non-transitory computer-readable medium storing instructions, the instructions comprising:
one or more instructions that, when executed by one or more processors, cause the one or more processors to:
receive, from a first device related to a first subscriber of a navigation service, data relating to a POI, and an indication to share the data,
the POI including one or more buildings, the data including:
on-site information associated with the POI, and
information regarding a virtual perimeter of an area at the POI, wherein the on-site information includes:
at least one of:
one or more instructions regarding arrival at the POI, or
one or more instructions regarding departure from the POI,
and
at least two of:
on-site radio communication channel information,
on-site access code information, or
on-site parking information;
store the data relating to the POI to permit the data to be accessible to other subscribers of the navigation service;
receive a location search request from a second device related to a second subscriber of the navigation service, the second subscriber being a different user than the first subscriber;
determine that the location search request corresponds to the POI; and
perform one or more actions to cause the data relating to the POI to be provided to the second device,
wherein the one or more instructions, that cause the one or more processors to perform the one or more actions, cause the one or more processors to specify, to the second device, the one or more instructions regarding the departure from the POI and the information regarding the virtual perimeter to permit the second device to identify the one or more instructions regarding the departure from the POI to be presented to the second subscriber when the second device exits the virtual perimeter.

9. The non-transitory computer-readable medium of claim 8, wherein the one or more instructions, that cause the one or more processors to receive the data relating to the POI and the indication to share the data, cause the one or more processors to:
receive the data relating to the POI and the indication based on one or more selections by the first subscriber.

10. The non-transitory computer-readable medium of claim 8, wherein the one or more instructions, that cause the one or more processors to receive the location search request from the second device, cause the one or more processors to:
receive the location search request based on one or more selections by the second subscriber.

11. The non-transitory computer-readable medium of claim 8, wherein the one or more instructions, when executed by the one or more processors, further cause the one or more processors to:
perform a search of one or more data structures based on the location search request; and
determine that the POI is included in a result of the search, and
wherein the one or more instructions, that cause the one or more processors to determine that the location search request corresponds to the POI, cause the one or more processors to:
determine that the location search request corresponds to the POI based on the determination that the POI is included in the result of the search.

12. The non-transitory computer-readable medium of claim 8, wherein the one or more instructions, when executed by the one or more processors, further cause the one or more processors to:
determine that the POI is related to other stored data; and
associate the data relating to the POI with the other stored data.

13. The non-transitory computer-readable medium of claim 12, wherein the one or more instructions, that cause the one or more processors to associate the data relating to the POI with the other stored data, cause the one or more processors to:
provide a reference that points the other stored data to the data relating to the POI,
wherein the reference permits the data relating to the POI to be provided as a result when searching for the other stored data.

14. The non-transitory computer-readable medium of claim 8, wherein the one or more instructions, when executed by the one or more processors, further cause the one or more processors to:
determine that the POI is related to other stored data; and
add, to the other stored data, the on-site information included in the data relating to the POI.

15. A method, comprising:
receiving, by a server device and from a first device related to a first subscriber of a navigation service, data relating to a point of interest (POI), and an indication to share the data, the POI including one or more buildings, the data including:
on-site information associated with the POI,
information regarding a virtual perimeter of an area at the POI,
wherein the on-site information includes:
at least one of:
one or more instructions regarding arrival at the POI, or
one or more instructions regarding departure from the POI,
and
at least two of:
on-site radio communication channel information,
on-site access code information, or
on-site parking information;
storing, by the server device, the data relating to the POI to permit the data to be accessible to other subscribers of the navigation service;
receiving, by the server device, a location search request from a second device related to a second subscriber of the navigation service,
the second subscriber being a different user than the first subscriber;
determining, by the server device, that the location search request corresponds to the POI; and
performing, by the server device, one or more actions to cause the data relating to the POI to be provided to the second device,
wherein performing the one or more actions comprises specifying, to the second device, the one or more instructions regarding the departure from the POI and the information regarding the virtual perimeter to permit the second device to identify the one or more instructions regarding the departure from the POI to be presented to the second subscriber when the second device exits the virtual perimeter.

16. The method of claim 15, wherein the on-site information further includes:
the one or more instructions regarding the arrival at the POI,
wherein the one or more instructions regarding the arrival at the POI include turn-by-turn arrival instructions based on one or more physical structures located on-site at the POI or an on-site layout of the POI.

17. The method of claim 15, wherein the on-site information further includes:
the one or more instructions regarding the departure from the POI,
wherein the one or more instructions regarding the departure from the POI include turn-by-turn departure instructions defined based on one or more physical structures located on-site at the POI or an on-site layout of the POI.

18. The method of claim 15, wherein the receiving the indication to share the data comprises:
receiving an indication to share only a portion of the data relating to the POI.

19. The method of claim 18, wherein the performing the one or more actions to cause the data relating to the POI to be provided to the second device comprises:
performing the one or more actions to cause only the portion of the data relating to the POI to be provided to the second device.

20. The method of claim 18, wherein the portion of the data relating to the POI includes the one or more instructions regarding the arrival at the POI and the one or more instructions regarding the departure from the POI.

\* \* \* \* \*